US009224221B2

(12) United States Patent
Vogel et al.

(10) Patent No.: US 9,224,221 B2
(45) Date of Patent: Dec. 29, 2015

(54) ARRANGED DISPLAY OF DATA ASSOCIATED WITH A SET OF TIME PERIODS

(75) Inventors: Andreas Vogel, San Francisco, CA (US); Lauren McMullen, Mountain View, CA (US); Simon Lee, Castro Valley, CA (US); Tuan Pham, Corvallis, OR (US)

(73) Assignee: SAP SE, Walldorf (DE)

( * ) Notice: Subject to any disclaimer, the term of this patent is extended or adjusted under 35 U.S.C. 154(b) by 694 days.

(21) Appl. No.: 13/324,648

(22) Filed: Dec. 13, 2011

(65) Prior Publication Data

US 2013/0147828 A1    Jun. 13, 2013

(51) Int. Cl.
*G06T 11/20* (2006.01)
*G09G 5/02* (2006.01)
*G06F 17/30* (2006.01)

(52) U.S. Cl.
CPC ........ *G06T 11/206* (2013.01); *G06F 17/30551* (2013.01); *G06F 17/30572* (2013.01); *G09G 5/02* (2013.01)

(58) Field of Classification Search
CPC ..... G06T 11/206; G06T 2200/24; G06T 5/40; G06T 2200/02; G06F 3/0481; G06F 17/246; G06F 17/3007; G06F 17/30477; G06F 21/602; G06F 17/60; G06F 17/30; G06F 3/048
See application file for complete search history.

(56) References Cited

U.S. PATENT DOCUMENTS

| | | | |
|---|---|---|---|
| 2002/0133385 A1* | 9/2002 | Fox et al. | 705/7 |
| 2003/0171965 A1* | 9/2003 | Ratzlaff et al. | 705/8 |
| 2007/0088600 A1* | 4/2007 | Lichtinger et al. | 705/10 |
| 2009/0125513 A1* | 5/2009 | Newbold et al. | 707/5 |
| 2009/0293011 A1* | 11/2009 | Nassar | 715/781 |
| 2010/0128988 A1* | 5/2010 | Kincaid | 382/199 |
| 2011/0205231 A1* | 8/2011 | Hartley et al. | 345/440 |

OTHER PUBLICATIONS

AngliaCampus,"Climatic Datafile for Castries", NPL, Anglia Campus, Jul. 1, 2002, http://www.jeron.je/anglia/learn/sec/geog/seclucia/act01.htm.*
Songshan, "City Profile", 2008 Healthy City,Taipe, http://songshan-healthycity-taipei.org.tw/City%20Profile_eng.asp?eng=1&obj=submenu1.*

* cited by examiner

*Primary Examiner* — Ming Hon
*Assistant Examiner* — Sarah Le
(74) *Attorney, Agent, or Firm* — Schwegman Lundberg & Woessner, P.A.

(57) ABSTRACT

In an embodiment, a method of providing an arranged display of data associated with a set of time periods is presented. In this method, values of a first data type are accessed, the values being observed during each of multiple time periods. An order for the time periods is determined based on the values of the first data type. A selectable region for each of the time periods is displayed, the regions being arranged according to the order. In response to a user selection of one of the selectable regions, a value of a second data type is displayed, the value of the second data type being observed during the time period of the selected one of the selectable regions.

19 Claims, 13 Drawing Sheets

ARRANGED DISPLAY OF DATA ASSOCIATED WITH A SET OF TIME PERIODS

FIELD

The present disclosure relates generally to the display of data associated with a set of time periods, such as, for example, days. In an example embodiment, the disclosure relates to the selection and display of data associated with a set of time periods, with at least the selection being based on the values of the data associated with each of the time periods.

BACKGROUND

Many different types of data may be associated with one or more sets of time periods. For example, utility usage and cost data, commodity cost and consumption data, and stock prices and trading volumes may each be associated with particular time periods, such as, for example, hours, days, weeks, and/or months. Ordinarily, such data may be reviewed by a user of a software application by selecting a particular time period, such as a specific day. In response to the selection, the application returns and displays at least some of the data associated with the selected time period.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for arranging and displaying data associated with multiple time periods, such as, for example, hours or days. Examples of such data include, but are not limited to: daily high, low, and/or average outdoor temperatures for a particular geographical area; spot and/or average electricity prices in a particular consumer market; instantaneous and/or average electrical power consumption for a particular household or geographic area; and commodity prices and/or other financial metrics.

As is described in greater detail below, these data associated with each time period may be arranged as selectable regions on a display based on the values of the data, such as in order of increasing value, as opposed to chronologically. In some implementations, a user selection of at least one of the data-based selectable regions may cause corresponding time-based selectable regions representing the time periods in a chronological fashion (such as selectable regions arranged as a calendar) to be visibly emphasized. In addition, selection of a time-based region may cause corresponding data-based selectable regions to be emphasized. In other examples, other data aside from the data represented in the data-based selectable regions may be displayed upon selection of a data-based or time-based selectable region. Further, the time-based selectable regions and/or the data-based selectable regions may be enhanced or augmented using the data associated with the corresponding time periods. Other aspects of the embodiments discussed herein may be ascertained from the following detailed description.

Figure 1A:
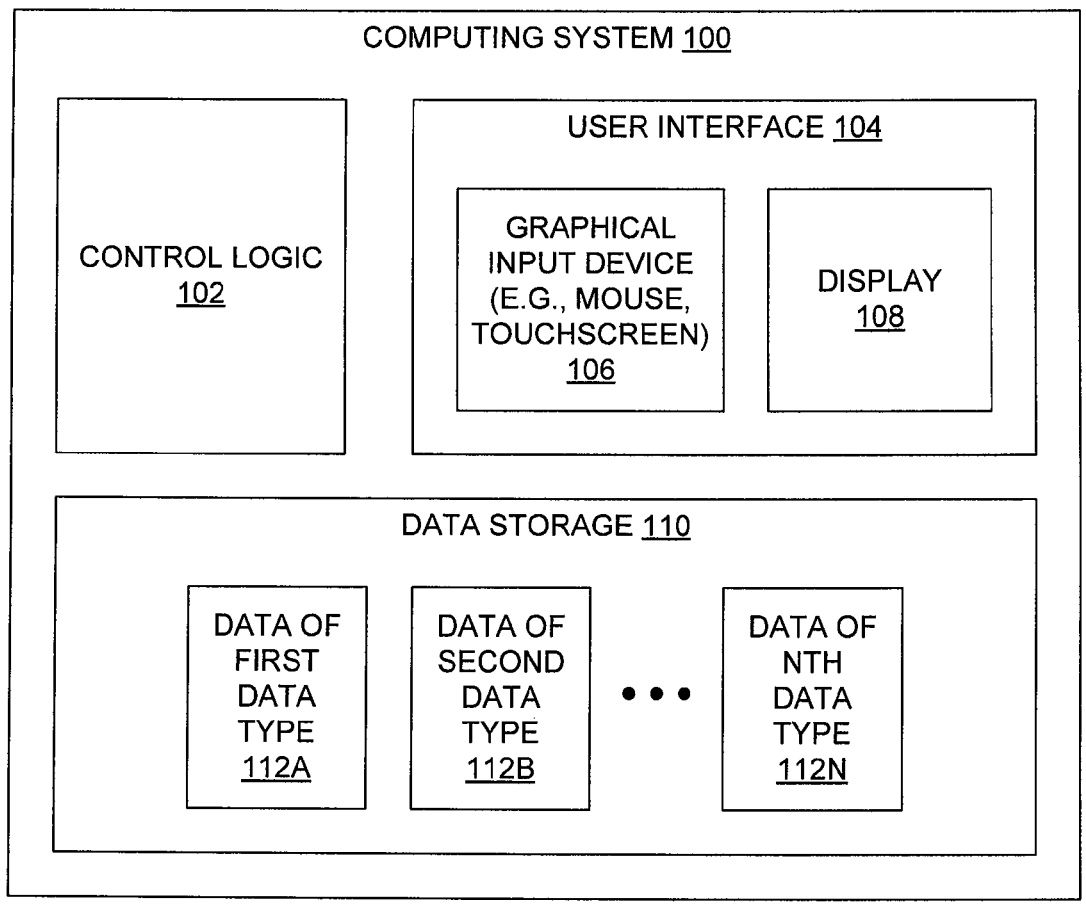
FIG. 1A is a block diagram depicting an example computing system for arranging and displaying data associated with multiple time periods.

FIG. 1A is a block diagram of an example computing system 100 for the arranging and display of data associated with multiple time periods. Examples of the computing system 100 may include, but are not limited to, desktop and laptop computers, communication or information servers, computer tablets, personal digital assistants (PDAs), smart phones, and any other device or system capable of presenting information to a user in a graphical format and receiving user input directing the presentation of the information. In other implementations, multiple such devices may be coupled to each other to form the computing system 100 of FIG. 1A.

The computing system 100 may include control logic 102, a user interface 104, and data storage 110. The user interface 104 may include, for example, a graphical input device 106, such as a mouse, touchpad, or the like, by which a user of the computing system 100 may select various selectable regions and provide other input, as discussed in greater detail below. The user interface 104 may also include a display 108 by which the various selectable regions and other data or information may be viewed. In some examples, the graphical input device 106 and the display 108 may be integrated together, such as by way of a touch screen or similar component.

The data storage 110 may store data of multiple types, such as temperature data, utility data, financial data, sports statistics, and so on. As shown in FIG. 1A, the data storage 110 contains or accesses data of a first data type 112A, data of a second data type 112B, and data of a nth data type 112N. Further, each data item may be associated with a particular time period, such as, for example, a specific second, minute, hour, day, week, month, or year. Larger or smaller time periods, or time periods not directly correlating to those listed above, may be employed in other examples. The data storage 110 may include either or both volatile data storage (such as, for example, static or dynamic random-access memory (RAM)) and/or non-volatile data storage (such as, for example, flash memory, hard disk drive (HDD) memory, optical disk drive (ODD) memory, and solid state disk (SSD) memory).

Figure 1B:
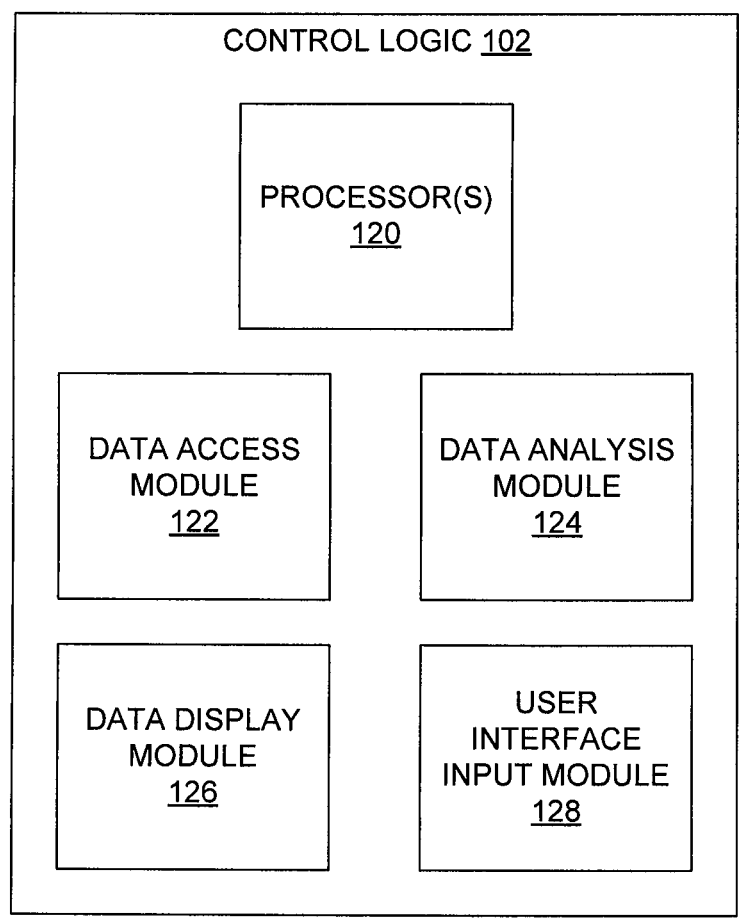
FIG. 1B is a block diagram depicting example control logic of the computing system of FIG. 1A.

FIG. 1B is a block diagram of an example of the control logic 102 of FIG. 1A, which may include one or more computer processors 120 capable of executing instructions to perform the various operations discussed hereinafter. In one example, the instructions may be organized as one or more modules. In other examples, such modules may include hardware, software, firmware, or some combination thereof. As shown in FIG. 1B, the control logic 102 may include a data access module 122, a data analysis module 124, a data display module 126, and a user interface input module 128.

The data access module 122 may facilitate access to one or more different types of data related to multiple time periods, such as the data types 112 depicted in FIG. 1A. The data access module 122 may access such data 112 stored within the computing system 100 of FIG. 1A, or access such data 112 stored in another system communicatively coupled to the computing system 100, such as a database, communication server, or the like. In one example, each data item of the data 112 may be associated with a specific time period during which the data item was observed, measured, captured, and/or received.

The data analysis module 124 may analyze or process the data 112 in a number of ways to present the data 112 and associated information to the user of the computing system 100 as described herein. In one example, the data analysis module 124 may compare data of a particular data type across multiple time periods in determine a particular presentation order for the data. The computing system 100 may perform other functions regarding data analysis, comparison, processing, and the like, as described below, in other examples.

The data display module 126 may provide the data 112 as multiple selectable regions, arranged as determined by the data analysis module 124, for presentation on the display 108 of FIG. 1A. In some examples, the data display module 126 may also visually emphasize certain ones of the selectable regions, present other data related to the times periods corresponding with the various selectable regions in or more formats, and perform other data presentation functions.

The user interface input module 128 may receive and interpret user inputs provided via the graphical input device 106 of FIG. 1A and/or other input means to direct the types of data 112, the amount of data 112, and other parameters or guidance regarding display of selectable regions and other information pertaining to the data 112 and/or corresponding time periods.

Figure 2:
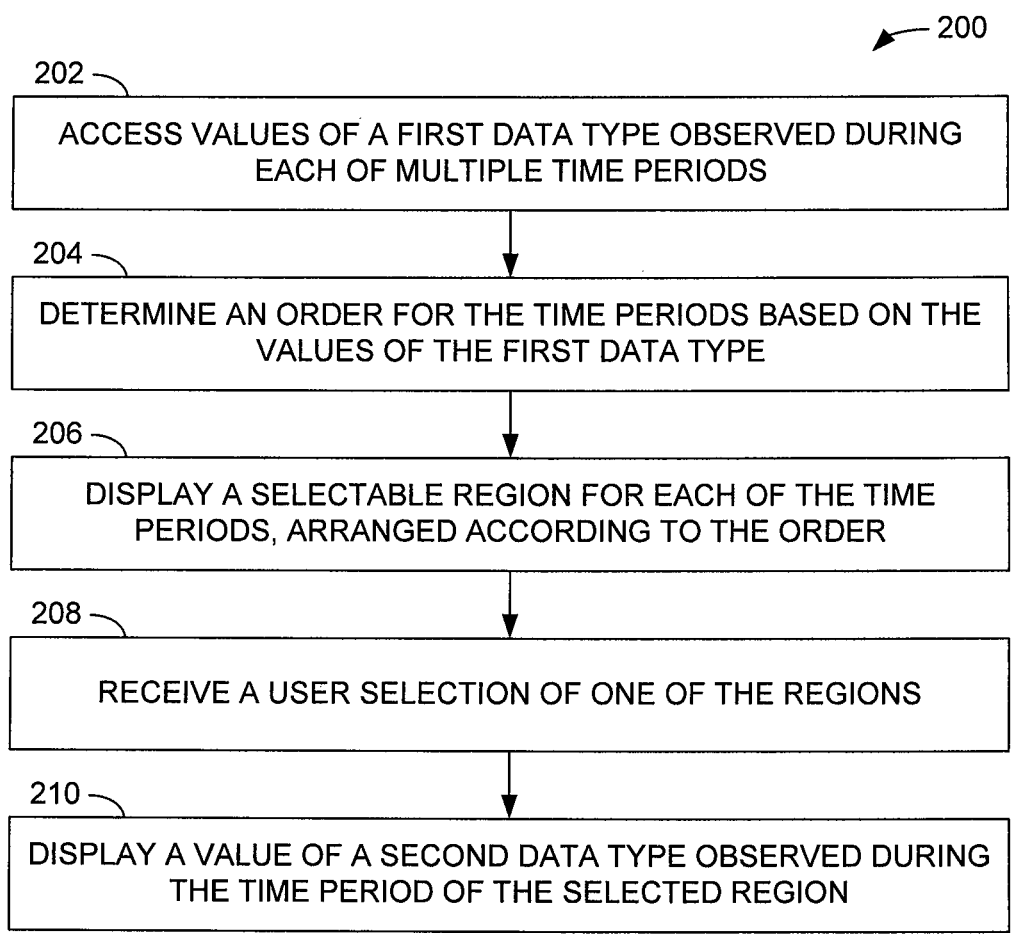
FIG. 2 is a flow diagram of an example method of arranging and displaying data associated with multiple time periods.

FIG. 2 provides a flow diagram of an example method 200 of arranging and displaying data (such as the data 112 of FIG. 1A) associated with a set of time periods. In the method 200, values of a first data type observed during each of multiple time periods may be accessed (operation 202). An order for the time periods based on the values of the first data type may then be determined (operation 204). A selectable region for each of the time periods may then be displayed, in which the selectable regions are arranged according to the order (operation 206). A user selection of one of the selectable regions may then be received (operation 208). Based on the user selection, a value of a second data type observed during the time period of the selected region may then be displayed (operation 210). While the operations of FIG. 2 and other figures provided herein are shown in a specific order, other orders of operation, including possibly concurrent execution of at least portions of one or more operations, may be possible in some implementations.

As a result of the method 200, the user may select one or more particular time periods based on the first data type associated with each of the time periods, as opposed to basing the selection on the identity of the time period. Further, as a result of that selection, the user may then peruse other types of data associated with that particular time period without directly selecting that time period.

Figure 3A:
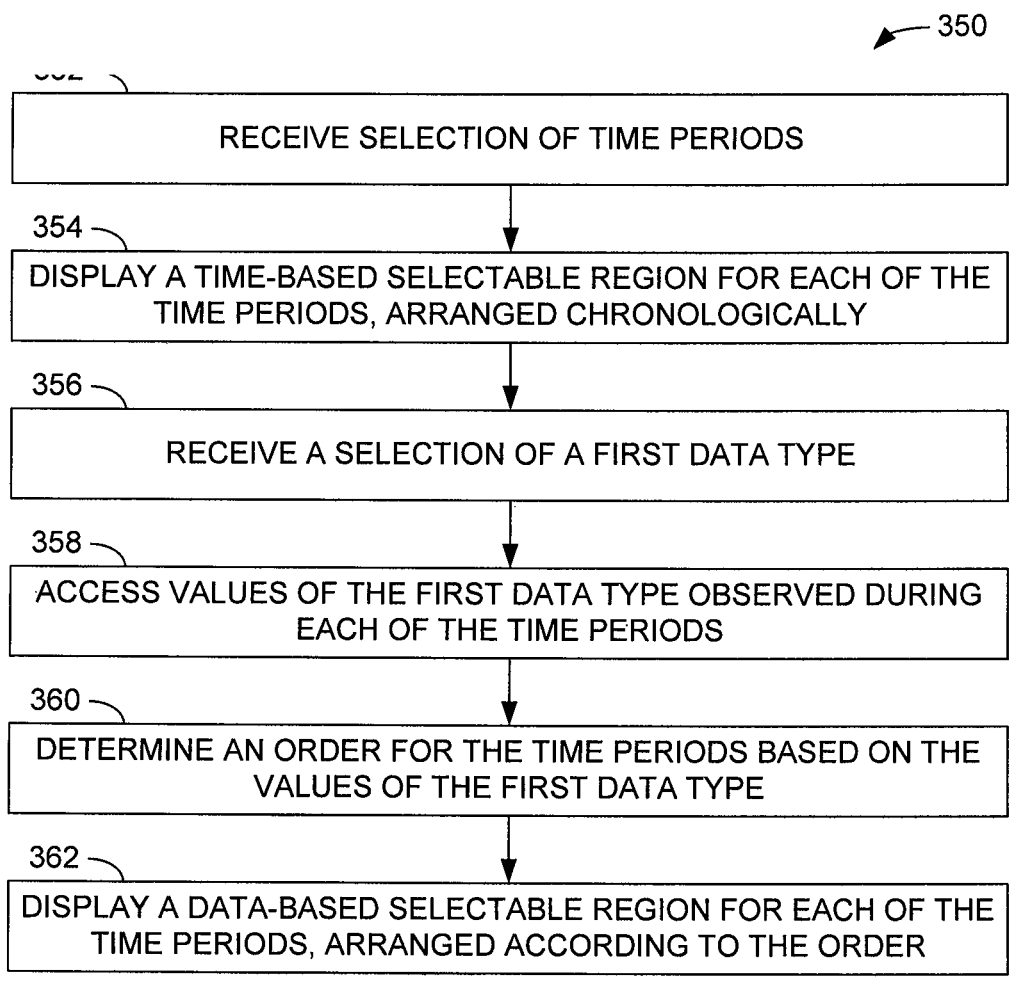
FIG. 3A is a flow diagram of an example method of displaying selectable regions for multiple time periods and data associated with the time periods.
Figure 3B:
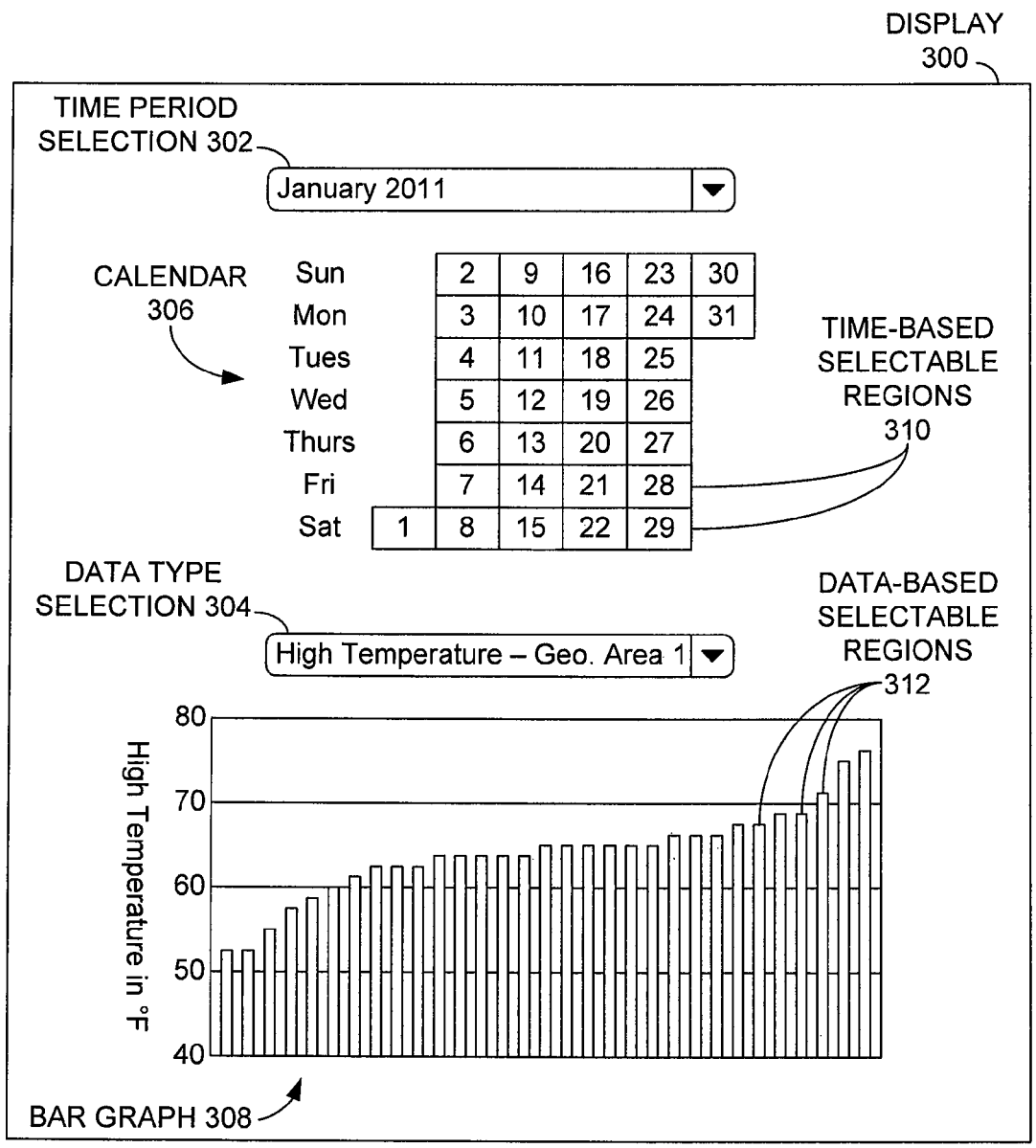
FIG. 3B is a graphical representation of an example display providing selectable regions for multiple time periods and data associated with the time periods.

FIG. 3A is a flow diagram of an example method 350 of arranging and displaying data associated with multiple time periods, the method 350 being explicated in reference to a graphical representation of an example display 300 presented in FIG. 3B. In the method 350, a user selection of a set of time periods is received (operation 352). In one example, the user may employ a dropdown menu or other graphical or textual means to indicate the time periods of interest. As shown in FIG. 3B, the time periods of interest are consecutive days, and the user has provided a time period selection 302 of "January 2011", thus indicating that the time periods of interest are the thirty-one contiguous days of that month. In another example, the user may select multiple weeks, months, or years, with each day representing one time period. In other implementations, specific individual days, possibly not consecutive or contiguous, may be selected. In yet other examples, time periods, such as seconds, minutes, hours, weeks, months, years, and so on, may serve as individual time periods.

Based on the user selection of time periods, a time-based selectable region for each of the time periods, arranged chronologically, may be displayed (operation 354). As depicted in the example of FIG. 3B, time-based selectable regions 310, each representing a day in the selected month, are presented as a calendar 306. Other formats for presenting or displaying the time-based selectable regions 310 may be utilized in other examples.

A user selection of a first data type associated with each of the time periods may also be received (operation 356). In the example of FIG. 3B, the user has provided via a dropdown menu a data type selection 304 of "High Temperature-Geographical Area 1", which represents the high temperature reading for a specific geographical area recorded or observed for each specific day. While temperature data is employed as the selected data type in this example, any other type of data that may be associated with, or may correspond with, specific time periods, including, but not limited to, commercial data, sales data, financial data, and statistical data, may be the type of data selected.

Values of the first data type observed during each of the time periods may then be accessed (operation 358). Such data may also indicate the specific time period with which the data was associated. For example, the data may have been recorded, captured, or released on that date. Such data may be stored within the computing system 100 (FIG. 1A) being employed by the user, or in another system in communication with the computing system 100, such as, for example, a server, database, or a peer computing system.

An order for the selected time periods may be determined based on the values of the selected data type (operation 360). By determining a particular order for the time periods based on the values of the selected data type, the user may be more likely to locate a particular time period of interest based on the values of the selected data type. In this particular example, the order being selected is an increasing order, from the lowest daily high temperature to the highest daily high temperature recorded in the geographical area during the month of January, 2011. Other orders, such as decreasing from highest to lowest values, may be employed in other examples.

A data-based selectable region for each of the time periods, arranged according to the determined order, may be displayed (operation 362). In the example of FIG. 3B, the data-based selectable regions 312 are arranged as separate bars of a bar graph 308, shown in order of value from left-to-right, lowest-to-highest. As shown, the height of each bar or region 312 indicates the value of the data type (i.e., daily high temperature), which, for the month of January, 2011, in Geographic Area 1, ranges from 52° F. to 77° F. In some examples, each of the data-based selectable regions 312 may be distinguished by way of other characteristics, including, but not limited to, width, length, area, shading, chrominance (i.e., color, hue, and the like), and luminance (i.e., brightness).

Figure 4A:
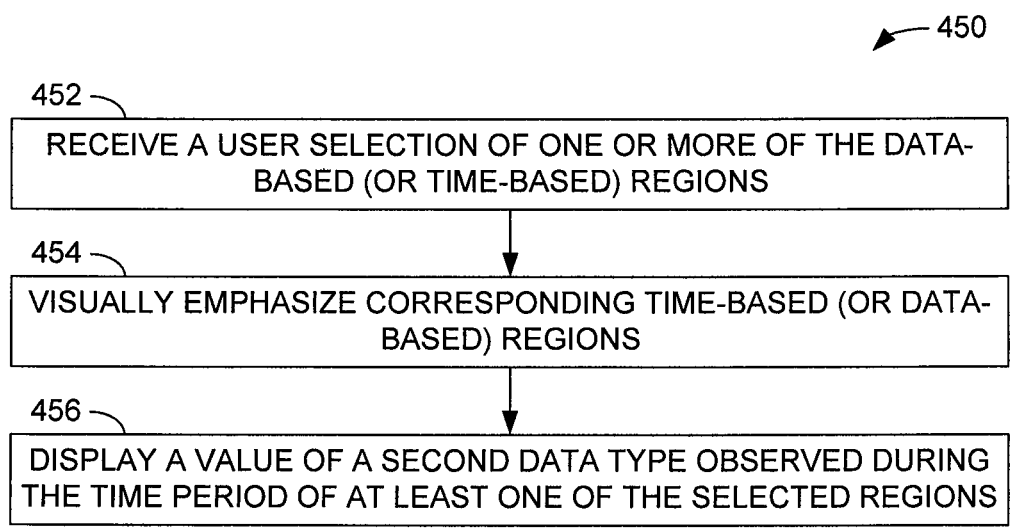
FIG. 4A is a flow diagram of an example method of displaying data associated with at least one user-selected selectable region.
Figure 4B:
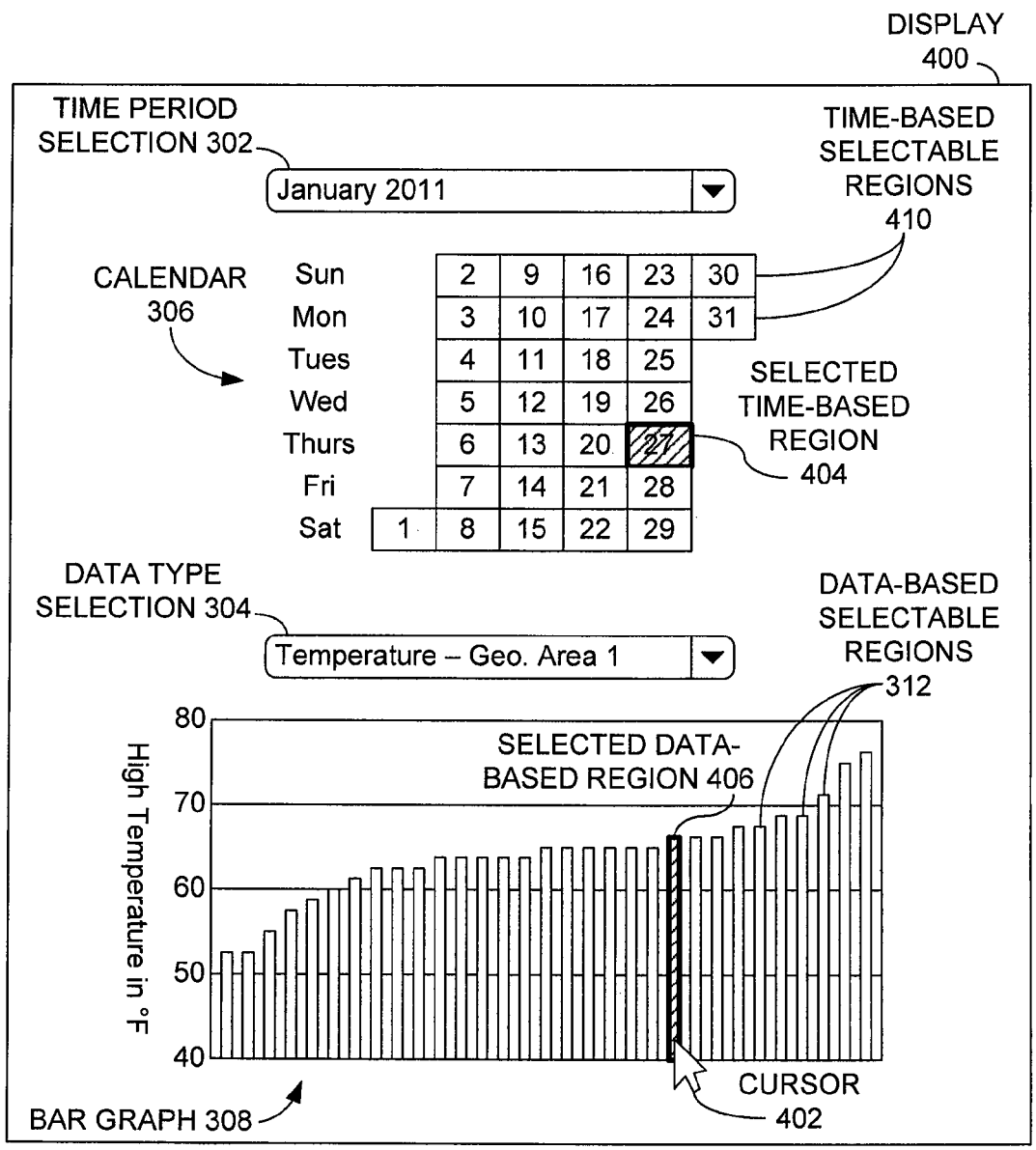
FIG. 4B is a graphical representation of an example display showing a user-selected selectable region.

Given the time-based selectable regions 310 and the data-based selectable regions 312, a user of the computing system 100 of FIG. 1A may relate each value of a first data type, as shown via the data-based selectable regions 312, to a particular time period, as indicated via the time-based selectable regions 310. FIG. 4A is a flow diagram of an example method 450 of displaying data for other data types associated with at least one of the time-based selectable regions 310 (FIG. 3B) and/or the data-based selectable regions 312 (FIG. 3B). In the example method 450, a user selection of one or more of the data-based selectable regions 312 is received (operation 452). FIG. 4B is a graphical representation of a display 400 in which the user has made such a selection. In FIG. 4B, the user makes the selection by allowing a cursor 402 or similar graphical pointing structure to rest or "hover" over a desired data-based selectable region 406. In another example, the user may place the cursor 402 over the desired data-based selectable region 406, and click, double-click, or provide some other confirmation of the selected data-based region 406. In some implementations, the user may employ other graphical or textual input means by which to indicate the selection. To provide feedback to the user regarding the identity of the data-based selectable region 312 being selected, the selected data-based region 406 may be visibly emphasized in some way, such as, for example, by shading, outlining, coloring, brightening, and/or flashing. In the specific example of FIG. 4B, the selected data-based region 406 is outlined and shaded differently from the other data-based selectable regions 312.

In response to the user selection, a time-based selectable region 404 associated with the selected data-based region 406 is visibly emphasized (operation 454 of FIG. 4A). In the example of FIG. 4B, the corresponding time-based region 404 is outlined and shaded differently from the remaining time-based selectable regions 410. In other examples, any form of visual emphasis may be employed, including, but not limited to, shading, outlining, coloring, brightening, and/or flashing, as described above.

Figure 4C:
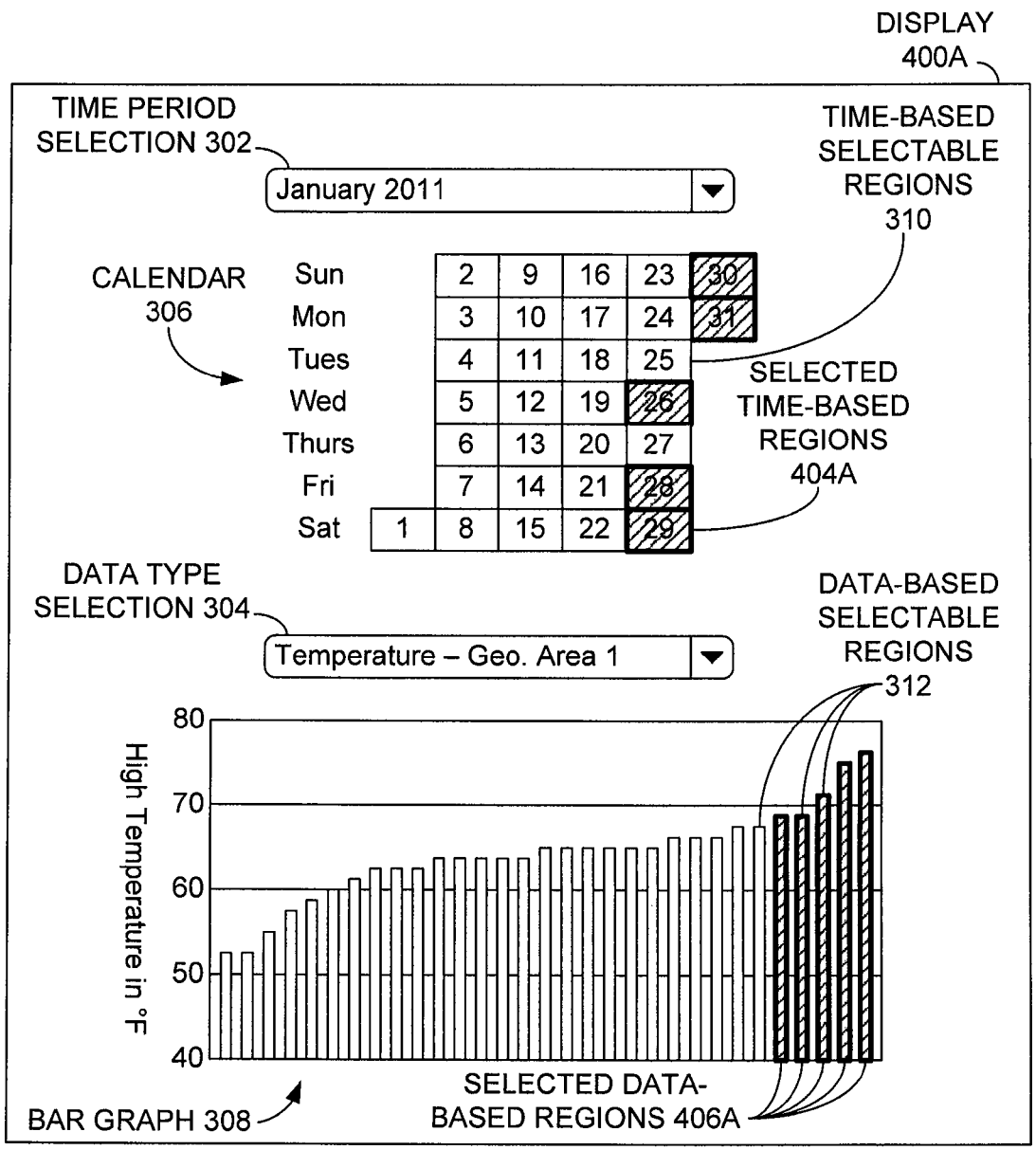
FIG. 4C is a graphical representation of an example display showing multiple user-selected selectable regions.

In some implementations, the user may indicate a selection of more than one data-based selectable region 312, resulting in the emphasizing of both the selected data-based regions and their corresponding time-based regions. An example of selecting multiple data-based selectable regions 312 is illustrated in FIG. 4C, in which the user has selected the five warmest days of the month of Jan. 11, 2011, in terms of observed high temperature, which are represented as the selected time-based regions 406A. In one example, the user may make the selection by forming a selection box about the data-based selectable regions 406A of interest. In another example, the user may individually select the desired data-based selectable regions 406A by way of clicking using a cursor, or by way of some other graphical means. In other implementations, the user may use graphical or textual means by which to select one or more time-based regions. For example, the display 400A may provide pull-down menus, data entry fields, and other mechanisms (not shown in the Figures) as filtering input by which a user may select a desired number or percentage of data-based selectable regions 312 at the high end or low end of the ranges of values for the first data type, such as the top ten highest, or the five lowest, regions in terms of temperature. In other examples, a specific number or percentage of values above or below a predetermined threshold, such a specific temperature, may be selected. In one implementation, the threshold may be an average value associated with the data-based selectable regions 312, such as the average daily high temperature during the month being viewed. Other numbers, percentages, thresholds, and so on may be specified by the user to select one or more of the data-based selectable regions 312 in other examples. In one instance, the selected time-based regions 404A corresponding to the selected data-based regions 406A are also visibly emphasized.

While the above examples discuss user selections of one or more of the data-based selectable regions 312, the user may also select at least one of the time-based selectable regions 310, resulting in emphasizing of one or both of the selected time-based regions 404A and their corresponding selected data-based regions 406A. For instance, the user may allow a cursor to rest over one of the time-based selectable regions 310 to select that region 404A, resulting in a visual emphasizing of the selected time-based regions 404A and or its corresponding data-based regions 406A.

Figure 4D:
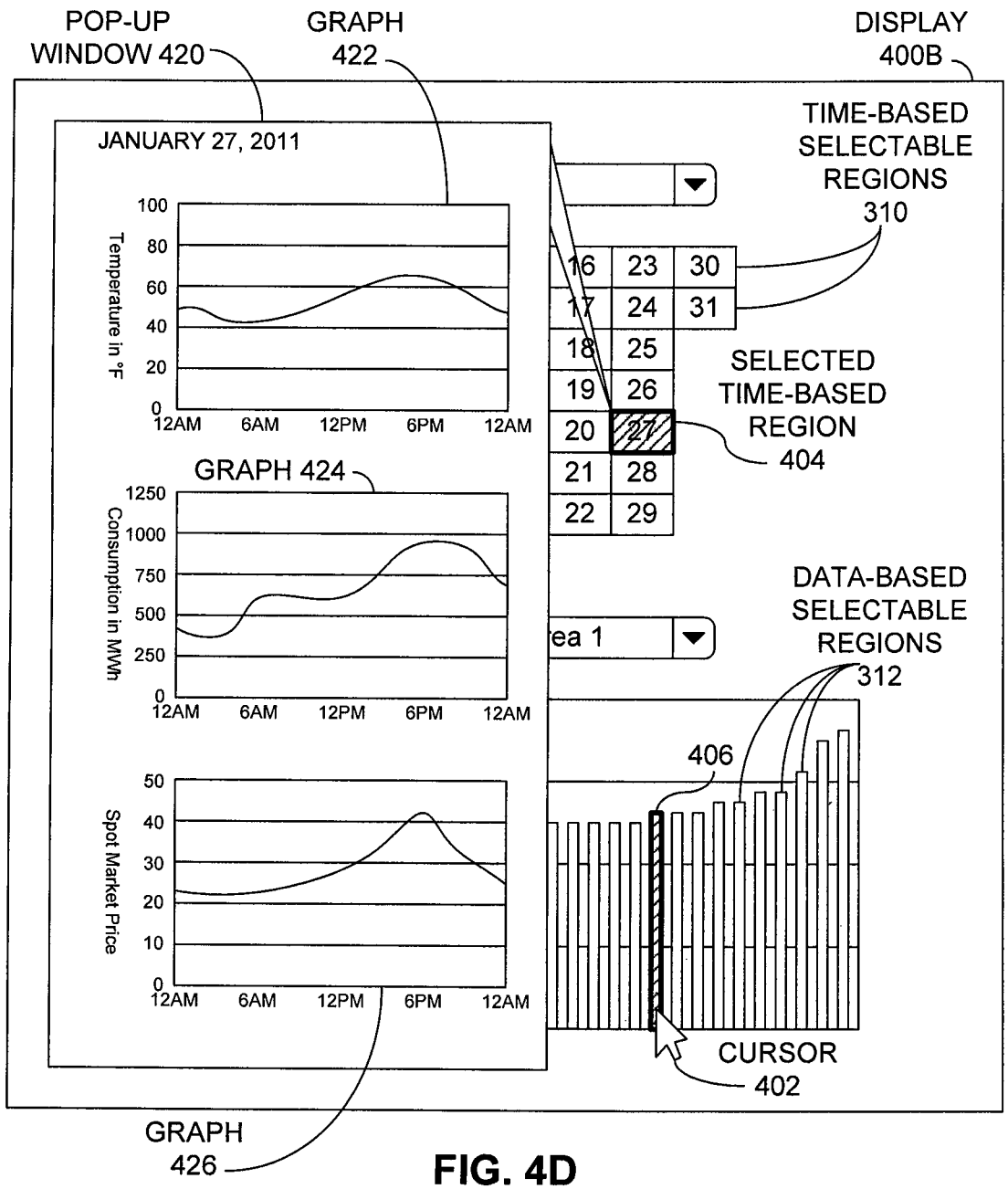
FIG. 4D is a graphical representation of an example display showing a user-selected region provided in conjunction with data pertaining to the time period associated with the user-selected region.

In the method 450 of FIG. 4A, once at least one of the data-based selectable regions 312 or time-based selectable regions 310 has been selected, at least one value of a second data type observed, captured, or obtained during the time period of at least one of the selected time-based regions 310 or data-based regions 312 may be displayed (operation 456). In FIG. 4D, in which a user selects a specific data-based region 406, in addition to the emphasizing of the selected data-based region 406 and its corresponding time-based region 404, other data relating to the time period associated with the selected regions 404, 406 are displayed to the user. In the specific example of FIG. 4D, this additional information is presented as a number of graphs 422, 424, 426 presented within a pop-up window 420. In one example, the user may cause this data to be displayed by way of a single or double mouse-click or touch screen tap of the selected data-based region 406 or its corresponding time-based region 404.

In the specific example of FIG. 4D, graphs are provided which indicate instantaneous values of three different data types, with the instantaneous data values spanning the time period corresponding to the selected time-based region 404 and the selected data-based region 406. As shown, the three data types are the temperature, the consumption of electricity, and the spot market price for electricity as observed over the selected time period. As indicated above, any data that can be associated with a particular time period may be presented to the user in other examples. Also, while the additional data are displayed as graphs, other formats for the presentation of data, such as charts, tables, icons, individual numeric or text values, and the like, may be displayed in other implementations. Further, a dedicated window, separate selectable tab, or other mechanism aside from a pop-up window may be employed to present the additional information in other examples. In addition, the user may be provided the ability to configure, select, or determine the types and format of the data, being presented in some embodiments.

Figure 5:
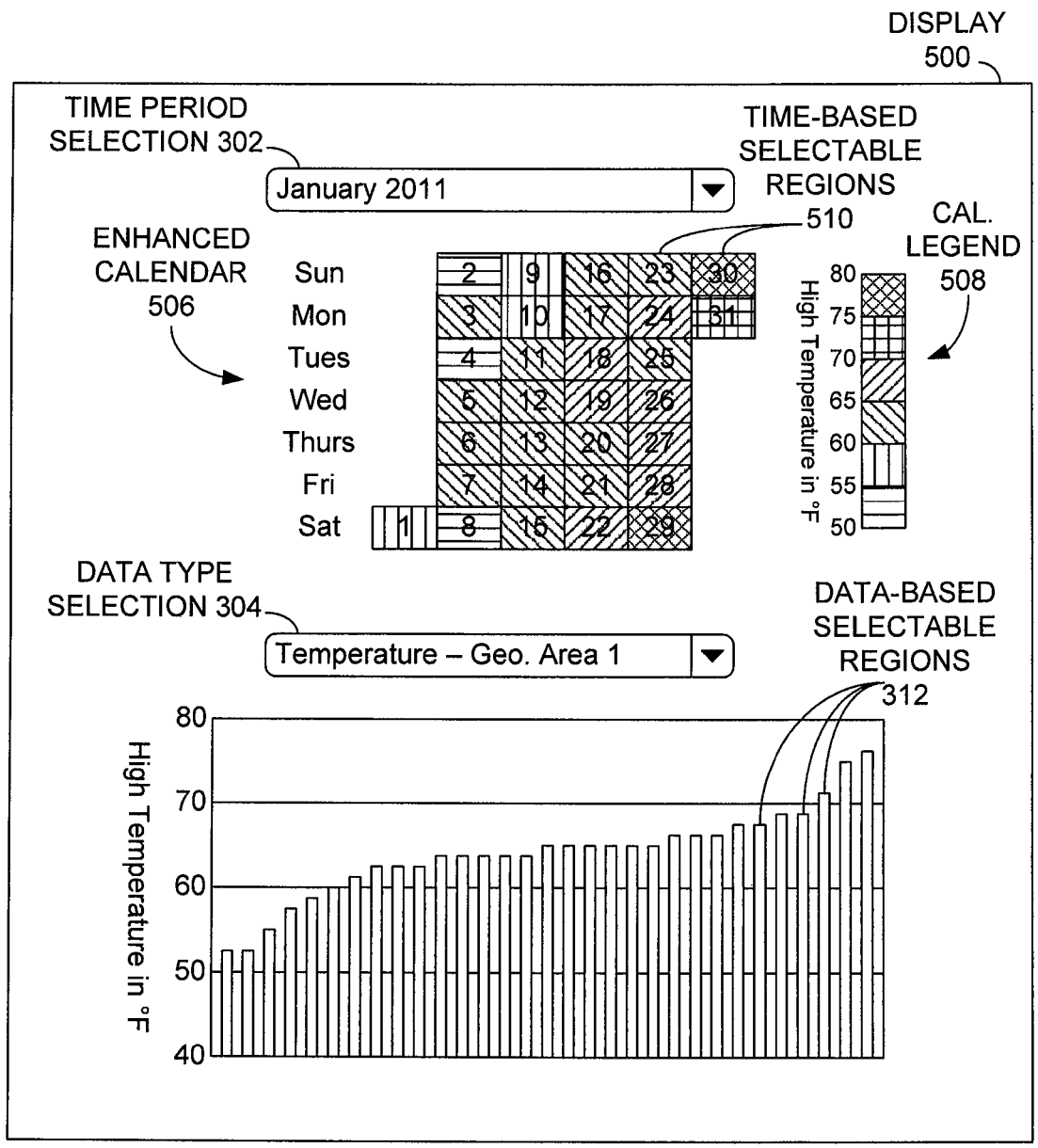
FIG. 5 is a graphical representation of an example display in which user-selected regions are enhanced via data associated with each of the multiple time periods.

FIG. 5 is a graphical representation of an example display 500 in which time-based selectable regions 510 may be annotated, augmented, or enhanced using the values of the first data type being presented in the data-based selectable regions 312. In the specific example shown in FIG. 5, each of multiple time-based selectable regions 510 are shaded according the value of first data type (i.e., daily high temperature) of the corresponding data-based selectable regions 312, resulting in an enhanced calendar 506. In other examples, other visible aspects of each of the time-based selectable regions 510, such as outline, chrominance, luminance, and the like, may be altered to correspond to the values of the first data type of the data-based selectable regions 312. Also in FIG. 5, a calendar legend 508 is provided which visibly indicates the correspondence between various shadings of the time-based selectable regions 510 and the corresponding numeric values of the first data type. In this example, each discrete level or type of shading is associated with a contiguous range of numeric values of the first data type. In other examples, the shading, coloring, or other characteristic of the time-based selectable regions 510 may be continuously associated with the possible data values. As a result of providing the enhanced time-based selectable regions 510, the user may view at a glance how the various values for the first data type are associated with the specified time periods without the user selecting one or more of the data-based selectable regions 312 or the time-based selectable regions 510.

In another example, the one or more modified visible characteristics of the time-based selectable regions 510 may correspond to particular groups of values of the first data type, or to particular patterns in those values, for the associated time-based selectable region 510. For example, daily temperatures that reflect a normal pattern of increase and decrease over the course of a day, such as decreasing until early morning, and then increasing until late afternoon, may be associated with a particular color or shading. Similarly, each of a number of atypical patterns of temperature changes throughout a day may each be represented by a different color or shading. By extension, shadings or colorings for particular data values or patterns may also be applied to the data-based selectable regions 312 to further add information content to those regions 312.

In at least some embodiments discussed herein, the display of data-based selectable regions may provide the user with access to additional data that may be related to the data specifically represented by the data-based selectable regions for corresponding time periods. Further, the addition of corresponding time-based selectable regions, displayed in conjunction with the data-based selectable regions, may aid the user in correlating the various data values with the multiple time periods involved.

Figure 6:
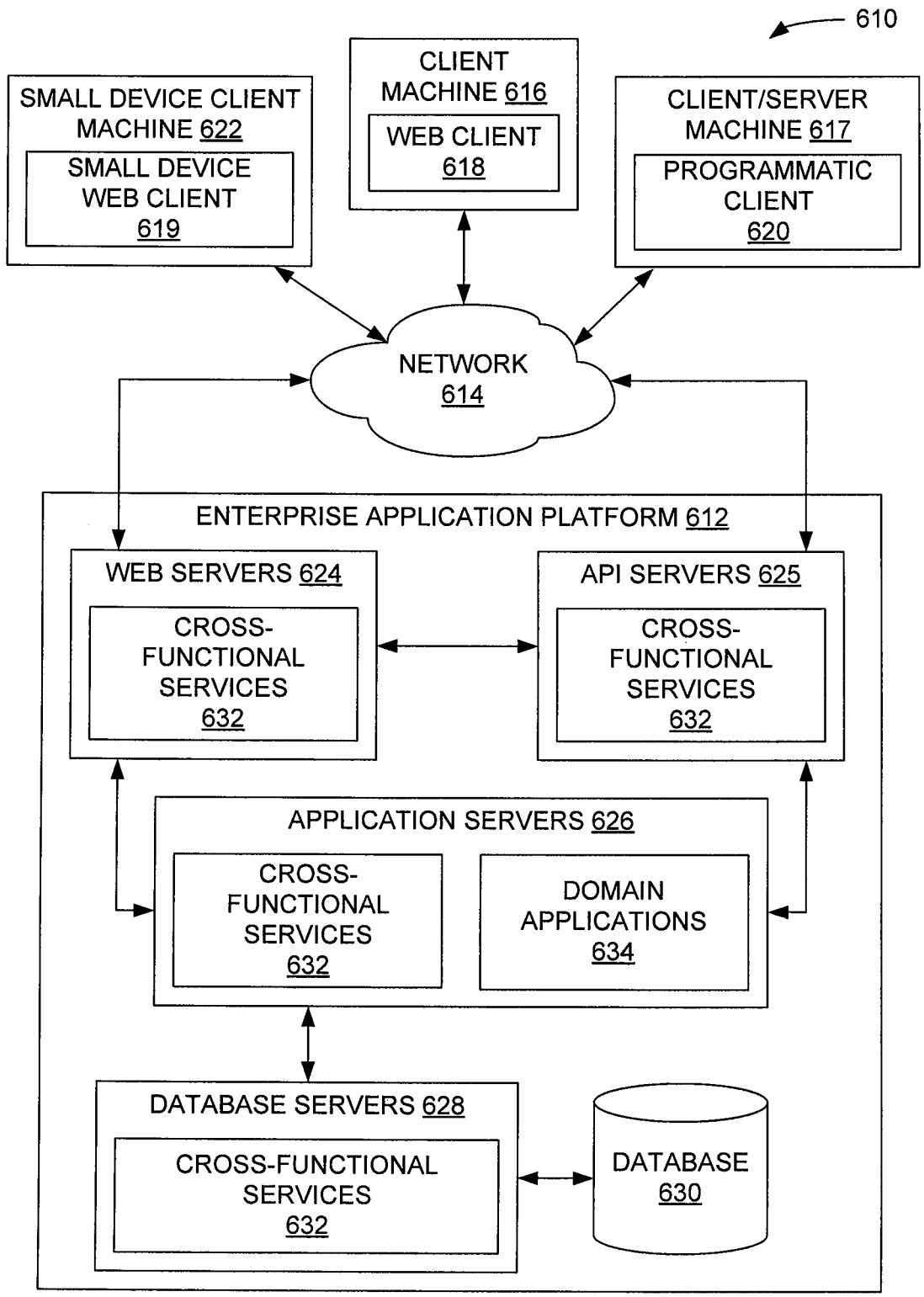
FIG. 6 is a block diagram of an example system having a client-server architecture for an enterprise application platform capable of employing the systems and methods described herein.

FIG. 6 is a network diagram depicting an example system 610, according to one exemplary embodiment, having a client-server architecture configured to perform the various methods described herein. A platform (e.g., machines and software), in the exemplary form of an enterprise application platform 612, provides server-side functionality via a network 614 (e.g., the Internet) to one or more clients. FIG. 6 illustrates, for example, a client machine 616 with a web client 618 (e.g., a browser, such as the INTERNET EXPLORER browser developed by Microsoft Corporation of Redmond, Wash. State), a small device client machine 622 with a small device web client 619 (e.g., a browser without a script engine) and a client/server machine 617 with a programmatic client 620.

Turning specifically to the enterprise application platform 612, web servers 624, and Application Program Interface (API) servers 625 are coupled to, and provide web and programmatic interfaces to, application servers 626. The application servers 626 are, in turn, shown to be coupled to one or more database servers 628 that may facilitate access to one or more databases 630. The web servers 624, Application Program Interface (API) servers 625, application servers 626, and database servers 628 may host cross-functional services 632. The application servers 626 may further host domain applications 634.

The cross-functional services 632 may provide user services and processes that utilize the enterprise application platform 612. For example, the cross-functional services 632 may provide portal services (e.g., web services), database services, and connectivity to the domain applications 634 for users that operate the client machine 616, the client/server machine 617, and the small device client machine 622. In addition, the cross-functional services 632 may provide an environment for delivering enhancements to existing applications and for integrating third party and legacy applications with existing cross-functional services 632 and domain applications 634. Further, while the system 610 shown in FIG. 6 employs a client-server architecture, the present disclosure is of course not limited to such an architecture, and could equally well find application in a distributed, or peer-to-peer, architecture system.

Figure 7:
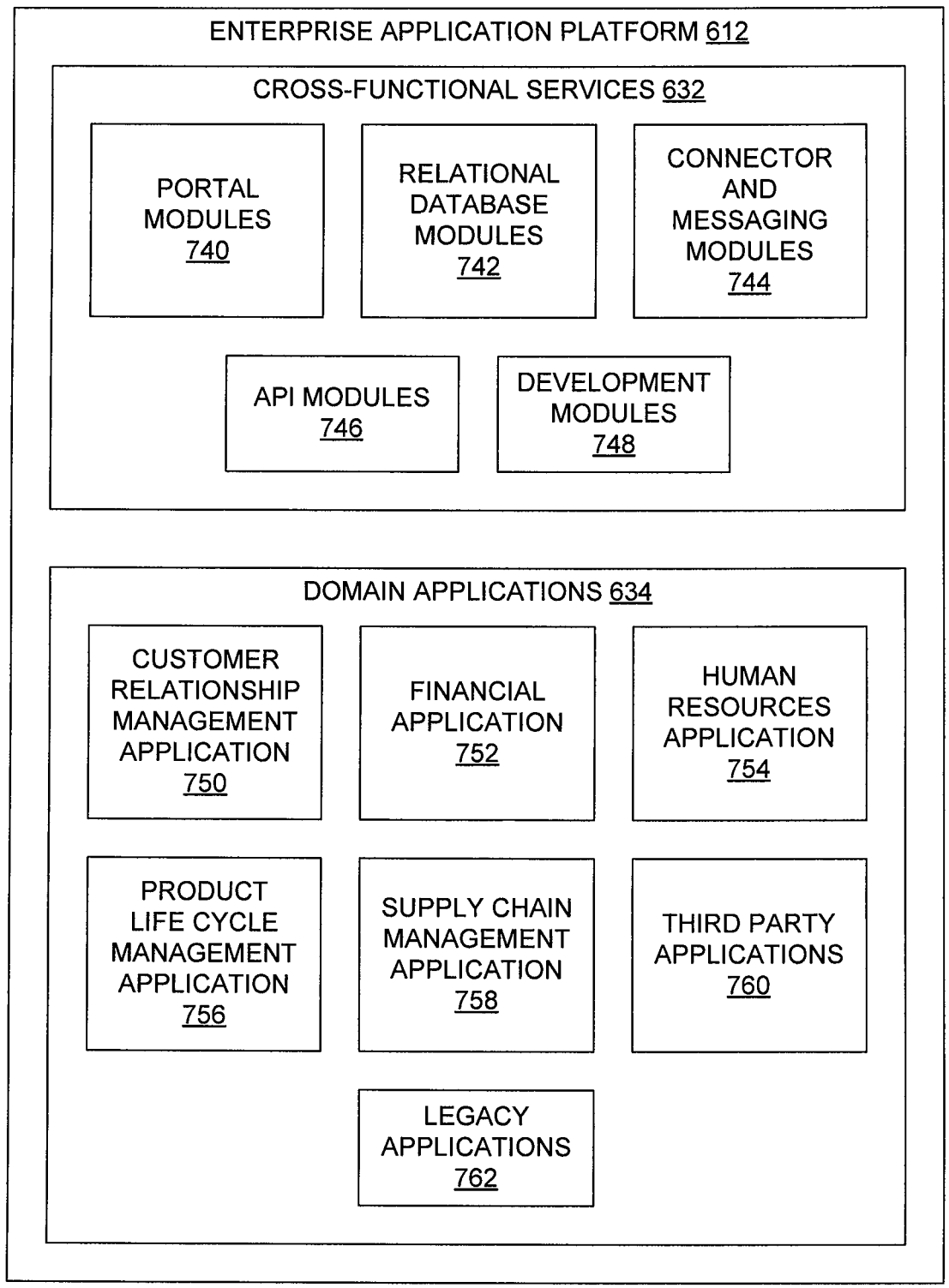
FIG. 7 is a block diagram of example applications and modules employable in the enterprise application platform of FIG. 6.

FIG. 7 is a block diagram illustrating example enterprise applications and services, such as those described herein, as embodied in the enterprise application platform 612, according to an exemplary embodiment. The enterprise application platform 612 includes cross-functional services 632 and domain applications 634. The cross-functional services 632 include portal modules 740, relational database modules 742, connector and messaging modules 744, Application Program Interface (API) modules 746, and development modules 748.

The portal modules 740 may enable a single point of access to other cross-functional services 632 and domain applications 634 for the client machine 616, the small device client machine 622, and the client/server machine 617 of FIG. 6. The portal modules 740 may be utilized to process, author, and maintain web pages that present content (e.g., user interface elements and navigational controls) to the user. In addition, the portal modules 740 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 740 may include, in one implementation, a generation module, a communication module, a receiving module, and a regenerating module. In addition, the portal modules 740 may comply with web services standards and/or utilize a variety of Internet technologies, including, but not limited to, Java, J2EE, SAP's Advanced Business Application Programming Language (ABAP) and Web Dynpro, XML, JCA, JAAS, X.509, LDAP, WSDL, WSRR, SOAP, UDDI, and Microsoft.NET.

The relational database modules 742 may provide support services for access to the database 630 (FIG. 6) that includes a user interface library. The relational database modules 742 may provide support for object relational mapping, database independence, and distributed computing. The relational database modules 742 may be utilized to add, delete, update, and manage database elements. In addition, the relational database modules 742 may comply with database standards and/or utilize a variety of database technologies including, but not limited to, SQL, SQLDBC, Oracle, MySQL, Unicode, and JDBC.

The connector and messaging modules 744 may enable communication across different types of messaging systems that are utilized by the cross-functional services 632 and the domain applications 634 by providing a common messaging application processing interface. The connector and messaging modules 744 may enable asynchronous communication on the enterprise application platform 612.

The Application Program Interface (API) modules 746 may enable the development of service-based applications by exposing an interface to existing and new applications as services. Repositories may be included in the platform as a central place to find available services when building applications.

The development modules 748 may provide a development environment for the addition, integration, updating, and extension of software components on the enterprise application platform 612 without impacting existing cross-functional services 632 and domain applications 634.

Turning to the domain applications 634, the customer relationship management applications 750 may enable access to and facilitate collecting and storing of relevant personalized information from multiple data sources and business processes. Enterprise personnel that are tasked with developing a buyer into a long-term customer may utilize the customer relationship management applications 750 to provide assistance to the buyer throughout a customer engagement cycle.

Enterprise personnel may utilize the financial applications 752 and business processes to track and control financial transactions within the enterprise application platform 612. The financial applications 752 may facilitate the execution of operational, analytical and collaborative tasks that are associated with financial management. Specifically, the financial applications 752 may enable the performance of tasks related to financial accountability, planning, forecasting, and managing the cost of finance.

The human resources applications 754 may be utilized by enterprise personal and business processes to manage, deploy, and track enterprise personnel. Specifically, the human resources applications 754 may enable the analysis of human resource issues and facilitate human resource decisions based on real-time information.

The product life cycle management applications 756 may enable the management of a product throughout the life cycle of the product. For example, the product life cycle management applications 756 may enable collaborative engineering, custom product development, project management, asset management, and quality management among business partners.

The supply chain management applications 758 may enable monitoring of performances that are observed in supply chains. The supply chain management applications 758 may facilitate adherence to production plans and on-time delivery of products and services.

The third-party applications 760, as well as legacy applications 762, may be integrated with domain applications 634 and utilize cross-functional services 632 on the enterprise application platform 612.

Figure 8:
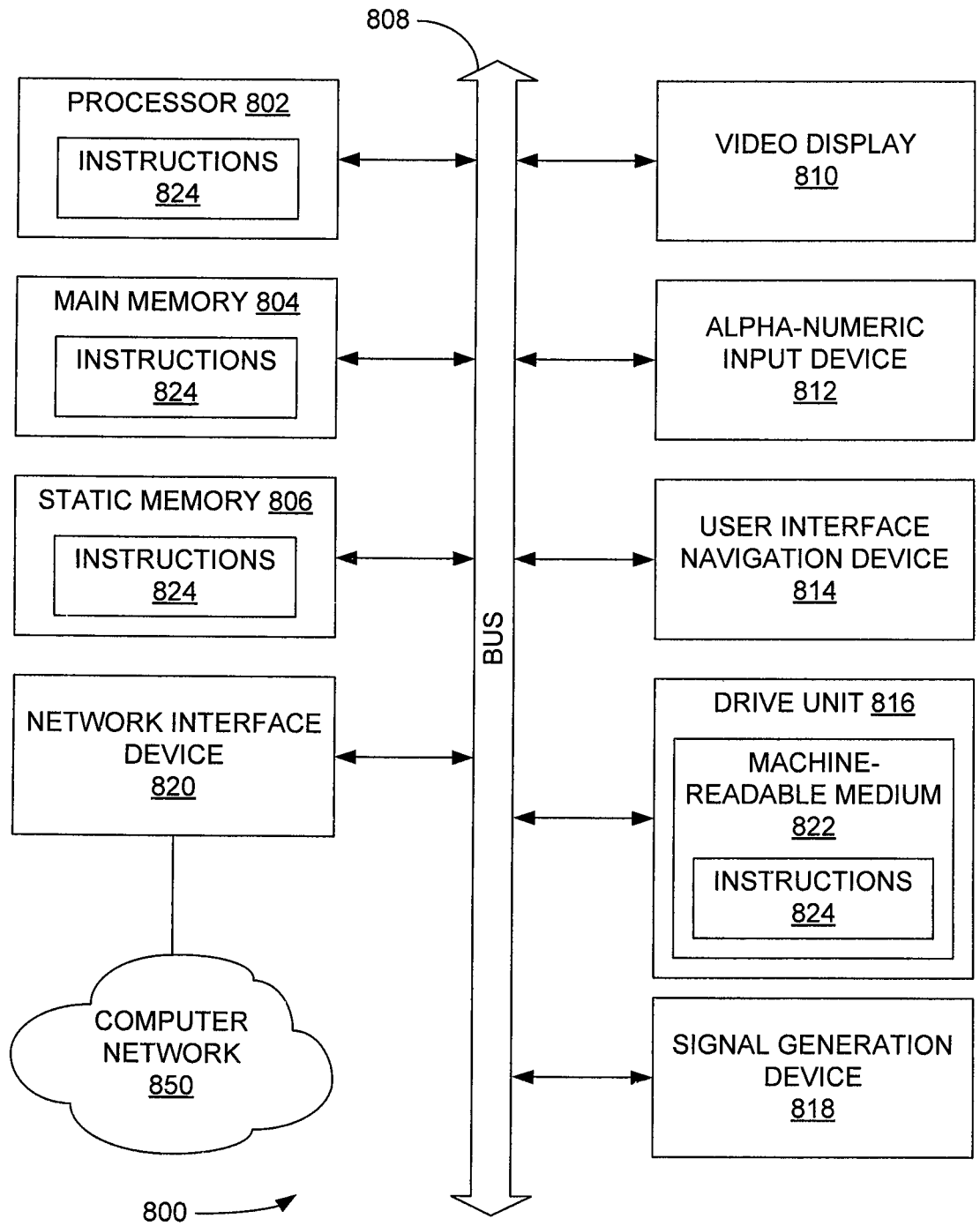
FIG. 8 depicts a block diagram of a machine in the example form of a processing system within which may be executed a set of instructions for causing the machine to perform any one or more of the methodologies discussed herein.

FIG. 8 depicts a block diagram of a machine in the example form of a processing system 800 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (for example, a central processing unit (CPU), a graphics processing unit (GPU), or both), a main memory 804 (for example, random access memory), and static memory 806 (for example, static random-access memory), which communicate with each other via bus 808. The processing system 800 may further include video display unit 810 (for example, a plasma display, a liquid crystal display (LCD), or a cathode ray tube (CRT)). The processing system 800 also includes an alphanumeric input device 812 (for example, a keyboard), a user interface (UI) navigation device 814 (for example, a mouse), a disk drive unit 816, a signal generation device 818 (for example, a speaker), and a network interface device 820.

The disk drive unit 816 (a type of non-volatile memory storage) includes a machine-readable medium 822 on which is stored one or more sets of data structures and instructions 824 (for example, software) embodying or utilized by any one or more of the methodologies or functions described herein. The data structures and instructions 824 may also reside, completely or at least partially, within the main memory 804, the static memory 806, and/or within the processor 802 during execution thereof by processing system 800, with the main memory 804 and processor 802 also constituting machine-readable, tangible media.

The data structures and instructions 824 may further be transmitted or received over a computer network 850 via network interface device 820 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 800) or one or more hardware modules of a computer system (for example, a processor 802 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 802 that is configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 802 that are temporarily configured (for example, by software) or permanently configured to perform the relevant operations. Whether temporarily or permanently configured, such processors 802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine but deployed across a number of machines. In some example embodiments, the processors 802 may be located in a single location (for example, within a home environment, within an office environment, or as a server farm), while in other embodiments, the processors 802 may be distributed across a number of locations.

While the embodiments are described with reference to various implementations and exploitations, it will be understood that these embodiments are illustrative and that the scope of claims provided below is not limited to the embodiments described herein. In general, techniques for providing managerial access to a managed system may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, comprising:
accessing values of a first data type selected by a user from a plurality of data types, wherein the values of the first data type are measured during each of a plurality of time periods identified by a user input, and wherein the values of the first data type do not comprise time values;
determining a non-chronological order for the plurality of time periods based on the values of the first data type;
displaying a first selectable region for each of the plurality of time periods, wherein the first selectable regions are arranged according to the non-chronological order; and
in response to a user selection of one of the first selectable regions, displaying at least a value of a second data type of the plurality of data types, wherein the value of the second data type is measured during the time period of the selected one of the first selectable regions, and wherein the displaying of at least the value of the second data type is performed by a processor of a machine.

2. The method of claim 1, a visible characteristic of each of the first selectable regions being representative of the value of the first data type measured during the time period of the first selectable region.

3. The method of claim 2 the visible characteristic comprising at least one of area, length, width, height, luminance, and chrominance.

4. The method of claim 1, further comprising:
displaying a second selectable region for each of the plurality of time periods, the second selectable regions being arranged according to a chronological order of the plurality of time periods.

5. The method of claim 4, further comprising:
visibly emphasizing the second selectable region for the same time period associated with the selected one of the first selectable regions relative to others of the second selectable regions.

6. The method of claim 4, further comprising:
in response to a user selection of one of the second selectable regions, visibly emphasizing the first selectable region for the same time period that is associated with the selected one of the second selectable regions.

7. The method of claim 4, a visible characteristic of each of the second selectable regions being representative of the value of the first data type measured during the time period of the associated second selectable region.

8. The method of claim 7, the visible characteristic comprising at least one of area, length, width, height, luminance, and chrominance.

9. The method of claim 1, the plurality of time periods comprising a contiguous plurality of time periods.

10. The method of claim 1, displaying the at least one value of the second data type measured during the time period of the selected one of the first selectable regions comprising displaying a graph of a plurality of values of the second data type measured during the time period of the selected one of the first selectable regions.

11. The method of claim 10, further comprising:
displaying a graph of a plurality of values of the first data type measured during the time period of the selected one of the first selectable regions.

12. The method of claim 1, further comprising:
in response to a user filter input for values of the first data type, comparing the filter input to the values of the first data type for the first selectable regions; and
visibly emphasizing a subset of the first selectable regions relative to others of the first selectable regions based on the comparison of the filter input to the value of the first data type measured during the time period for each of the first selectable regions.

13. The method of claim 12, the filter input comprising at least one of a threshold value, a percentage of the plurality of time periods, and a number of the plurality of time periods.

14. The method of claim 1, wherein, in the non-chronological order, the plurality of time periods are not ordered according to a time value associated with each of the plurality of time periods.

15. A non-transitory computer-readable storage medium comprising instructions that, when executed by at least one processor of a machine, cause the machine to perform operations comprising:
accessing values of a first data type selected by a user from a plurality of data types, wherein the values of the first data type are measured during each of a plurality of time periods identified by a user input, and wherein the values of the first data type do not comprise time values;
determining a non-chronological order for the plurality of time periods based on the values of the first data type;
displaying a first selectable region for each of the plurality of time periods, wherein the first selectable regions are arranged according to the non-chronological order; and
in response to a user selection of one of the first selectable regions, displaying at least a value of a second data type of the plurality of data types, wherein the value of the second data type is measured during the time period of the selected one of the first selectable regions.

16. A system comprising:
a user interface;
data storage; and
at least one processor configured to:
access values of a first data type selected by a user from a plurality of data types, wherein the values of the first data type are measured during each of a plurality of time periods identified by a user input, and wherein the values of the first data type do not comprise time values;
determine a non-chronological order of the plurality of time periods based on the values of the first data type;
display via the user interface a first selectable region for each of a plurality of time periods, wherein the first selectable regions are arranged according to the non-chronological order;
receive from a user via the user interface a selection of one of the first selectable regions; and
in response to receiving the selection, display via the user interface at least a value of a second data type of the plurality of data types, wherein the value of the second data type is measured during the time period of the selected one of the first selectable regions.

17. The system of claim 16, the selection of the one of the first selectable regions initiated via a graphical cursor hovering over the one of the first selectable regions.

18. The system of claim 16, the non-chronological order comprising an ascending order according to the value for the first data type measured during each of the plurality of time periods.

19. The system of claim 16, the at least one processor to display via the user interface each of the first selectable regions in a color according to the value for the first data type measured during each of the plurality of time periods.

* * * * *